United States Patent
Fasen

(10) Patent No.: US 8,488,267 B2
(45) Date of Patent: Jul. 16, 2013

(54) SENSOR POSITION ADJUSTMENT WITH MEDIA VELOCITY RELATIVE SAMPLE TIMING

(75) Inventor: Donald J. Fasen, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 306 days.

(21) Appl. No.: 12/993,796

(22) PCT Filed: Jun. 6, 2008

(86) PCT No.: PCT/US2008/066017
§ 371 (c)(1),
(2), (4) Date: Nov. 19, 2010

(87) PCT Pub. No.: WO2009/148453
PCT Pub. Date: Dec. 10, 2009

(65) Prior Publication Data
US 2011/0063752 A1    Mar. 17, 2011

(51) Int. Cl.
G11B 15/52    (2006.01)
G11B 5/58     (2006.01)
G11B 21/02    (2006.01)

(52) U.S. Cl.
USPC ............... 360/73.12; 360/75; 360/77.01

(58) Field of Classification Search
None
See application file for complete search history.

(56) References Cited

U.S. PATENT DOCUMENTS

| 6,098,046 | A  | * | 8/2000 | Cooper et al. ............... 704/503 |
| 6,819,514 | B1 | * | 11/2004 | Behrens et al. ................. 360/65 |
| 7,245,450 | B1 | * | 7/2007 | Cherubini et al. ......... 360/73.12 |
| 7,265,935 | B2 | * | 9/2007 | Bui et al. .................... 360/77.12 |
| 7,729,070 | B2 | * | 6/2010 | Feller ............................ 360/39 |
| 7,924,520 | B2 | * | 4/2011 | Fasen ............................ 360/39 |
| 2005/0083601 | A1 | | 4/2005 | Mahnad et al. |
| 2005/0219734 | A1 | | 10/2005 | Rothermel et al. |
| 2007/0230033 | A1 | | 10/2007 | McAllister et al. |
| 2008/0037154 | A1 | | 2/2008 | Biskeborn et al. |

FOREIGN PATENT DOCUMENTS

JP    2006244540 A    9/2006
WO    2009148453 A1    12/2009

OTHER PUBLICATIONS

Fasen et al., International Search Report and Written Opinion dated Dec. 18, 2008; PCT/US2008/066017, filed Jun. 6, 2008.

* cited by examiner

*Primary Examiner* — K. Wong

(57) ABSTRACT

A system and method for positioning a sensor relative to a storage medium. A system includes a first sensor and a second sensor arranged so that a point of a storage medium traverses each sensor at a different time. A processor is coupled to the sensors. The processor varies the timing of a sample representing a noise signal received from the sensors in accordance with medium velocity. The processor adjusts the position of the sensors based on the sample.

15 Claims, 3 Drawing Sheets

SENSOR POSITION ADJUSTMENT WITH MEDIA VELOCITY RELATIVE SAMPLE TIMING

CROSS-REFERENCE TO RELATED APPLICATION

The present application claims priority to PCT/US2008/066017, filed 6 Jun. 2008, hereby incorporated herein by reference.

BACKGROUND

Magnetic storage devices are often included in computer systems to provide high capacity secondary storage or data archival. Magnetic tape systems are a type of magnetic storage. Magnetic tape systems are widely used because they provide high storage densities while employing low cost media.

A magnetic tape system generally comprises a recording media, magnetic tape, and a media access device known as a tape drive or tape transport that reads data from and writes data to the magnetic tape. A magnetic tape typically comprises a flexible narrow ribbon of a base material (e.g., polyester films such as polyethylene naphthalate or polyethylene tereohthalate), and a magnetic material, such as a metal particulate, affixed to the base material by a binding agent (e.g., vinyl chloride polymer). The tape drive accesses the magnetic tape as the tape passes over a set of transducers or sensor elements affixed to a head assembly. Write elements generate magnetic fields which encode data onto the tape as the tape passes over the head. Read elements sense the magnetic fields of the tape's magnetic material to read data from the tape.

Linear tape systems employ multiple data tracks that run parallel to one another over a length of the tape. Such tapes often include more data tracks than the tape drive has head elements. These systems use a serpentine recording method wherein a first set of data tracks is written as the tape moves across the head in a forward direction, and a second set of data tracks is written as the tape moves across the head in the reverse direction. Many direction reversals may be required to write a tape with hundreds or thousands of tracks.

Tape density has increased manyfold over the years and the future portends no abatement of this trend. One method for increasing tape density in linear tape systems involves increasing the number of data tracks on the tape. Because tape width is fixed, increasing the number of data tracks requires that the tracks be narrowed. Narrower data tracks unfortunately cause a design burden on the tape drive's head control system, in that the head control system must be capable of accurately positioning the heads relative to the narrowed tracks.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
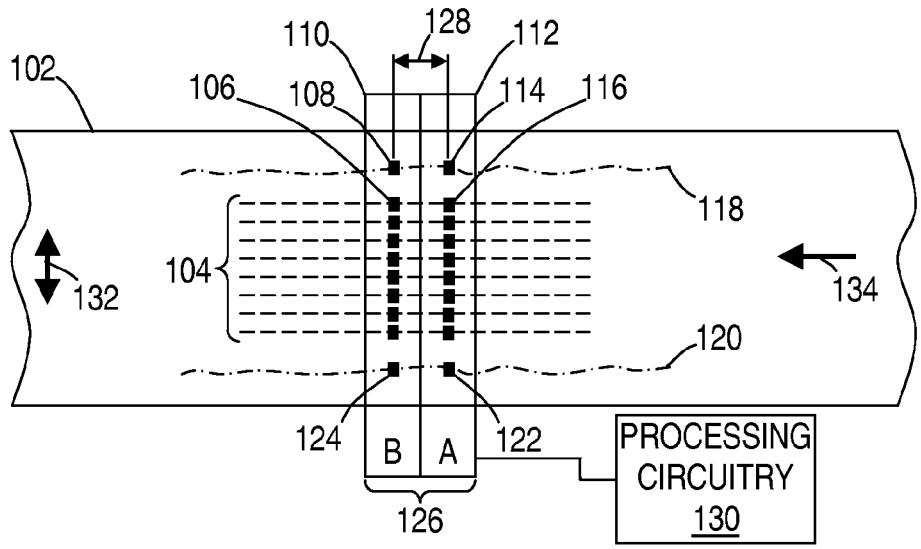
FIG. 1 shows a tape head comprising a plurality of sensors for detecting a servo track in accordance with various embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment. For example, while generally described in terms of application to magnetic tape systems, those skilled in the art will understand that embodiments are applicable to a wide variety of storage systems using media comprising a servo track (e.g., magnetic disk, optical disk, or optical tape).

Increasing tape density by increasing the number of data tracks on a tape necessitates narrowing the data tracks. In order to make effective use of such narrowed data tracks, it is desirable to improve the head positioning accuracy of tape drives. Linear tape systems, for example tape systems compliant with the Linear Tape Open ("LTO") standard, align their tape heads to tape media by having the heads follow a servo pattern written onto the tape during manufacture. The pre-written servo track may contain an unwanted noise component created by, for example, speed and/or position variations occurring as the servo track is written to tape. As the tape drive's head positioning system attempts to align the head with the tape, the written-in noise, if present, is added to the true position of the head relative to the tape, and therefore contributes to tracking error. The contribution of written-in noise to head tracking error has become more significant as noise from other sources has been suppressed.

Embodiments of the present disclosure provide accurate tracking of a tape drive's data heads relative to the tape by eliminating the detrimental effects of servo-track written-in noise. Embodiments isolate the written-in noise component in real-time as the tape traverses the heads. The written-in noise is then filtered from the head position signal resulting in more accurate head position information. By more accurately resolving the true position of the heads, embodiments more accurately track the tape allowing for narrower data tracks and higher tape density.

FIG. 1 shows a head 126 comprising a plurality of sensor elements (also termed servo elements) 108, 114, 122, 124 for detecting a servo track 118, 120 in accordance with various embodiments. The system of FIG. 1 comprises the head 126, storage media 102, and processing circuitry 130 for controlling the position of the head 126 relative to the storage media 102. In various embodiments, the media 102 may be a magnetic tape or disk, or optical tape or disk, where the head 126 is adapted to access the selected media 102. In the following description, embodiments are described in terms of magnetic tape 102; however, embodiments are also applicable to various types of storage media 102.

The tape 102 comprises a plurality of data tracks 104 and servo tracks 118, 120. While eight data tracks 104 are shown, in practice, the tape 102 may include any number of data tracks. Similarly, while two servo tracks 118, 120 are shown, the tape 102 may include any number of servo tracks. Generally, user data is written to and read from the data tracks 104. The servo tracks 118, 120 contain positioning data pre-written onto the tape during manufacture, and as explained above, an unwanted noise component affecting tracking also written onto the tape during manufacture.

The tape head 126 comprises a pair of raised areas 110, 112 known as "bumps." Each bump 110, 112 includes data access elements 106, 116 for reading and/or writing the data tracks 104, and sensor elements 108, 114, 122, 124 for reading tape servo tracks. Embodiments may differ as to the number of bumps, and the number of data elements and/or servo elements per bump. As illustrated, the elements of the two bumps 110, 112, for example, sensor elements 108 and 114, are disposed from one another by a known distance 128 in the direction of media motion 132. Thus, in a linear tape system embodiment, the sensor elements 108 and 114 are disposed from one another in the direction of longitudinal tape motion. In a disk drive embodiment, the sensor elements 108 and 114 are disposed from one another in the direction of rotational disk motion. The sensor elements 108, 114 may be any elements capable of accessing the associated media 102, for example, magnetic transducers for accessing magnetic media (e.g., tape or disk), or optical transducers for accessing optical media.

In some embodiments, the two bumps 110, 112 are provided to allow an element 116 of one bump 112 to write to the tape 102, while an element 106 of the other bump 110 reads the data written to the tape 102 when the tape 102 moves across the head 126 in direction 132. The function of elements 106, 116 is reversed when the tape 102 traverses the head 126 in the opposite direction.

Embodiments apply the sensor elements 108, 114 and processing circuitry 120 to determine head 126 position relative to the tape 102 and to reposition the head 126 as needed to maintain proper tracking. By detecting the servo track 118 using the pair of sensor elements 108, 114, embodiments are able to isolate the servo track written-in in noise, and by eliminating that noise, to produce a more accurate head position signal.

Processing circuitry 130 includes circuitry for receiving signals from the servo track sensor elements 108, 114, circuitry for computing servo-track written-in noise, circuitry for determining head 126 position, and circuitry for correcting head 126 position.

Figure 2:
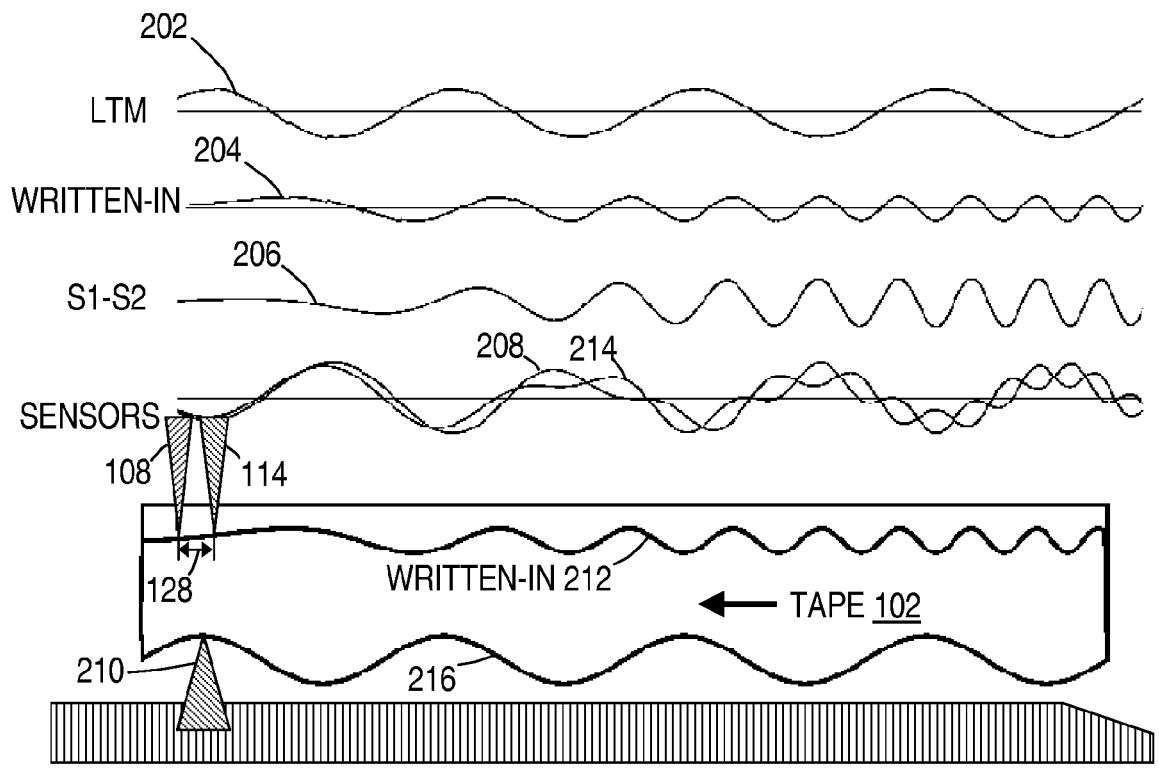
FIG. 2 shows signals provided by the servo track sensors and processed to produce a lateral tape motion signal for accurate positioning of a tape head in accordance with various embodiments.

FIG. 2 shows signals provided by the servo track sensor elements 114, 108 and processed to produce a lateral tape motion signal 202 (i.e., the true tape position signal) for accurate positioning of a tape head in accordance with various embodiments. In FIG. 2, the tape 102 is traversing the tape path of a tape drive. The tape is guided across the head by, for example, a flanged roller 210. As the tape 102 moves over the head 126, the tape experiences lateral motion 216 (i.e., the tape moves in direction 132 as indicated in FIG. 1). Embodiments of the present disclosure resolve the lateral motion 216 and adjust the position of head 126 accordingly to maintain proper head element 116, 106 position relative to the data tracks 104.

The tape's servo track 118 comprises a written-in noise signal 212. As the servo track 118 traverses the head 126, servo sensor 114 produces signal 214 and servo sensor element 108 produces signal 208. Signals 214 and 208 comprise both lateral tape motion signal 216 and written-in noise signal 212. Signals 214 and 208 are provided to processing circuitry 130 for head positioning.

Processing circuitry 130 receives the signals 214, 208 and computes the difference of the two signals to produce signal S1-S2 206. As shown in FIG. 2, S1-S2 206 is a similar, but somewhat distorted version of written-in noise signal 212. In the example of FIG. 2, the lower frequencies of S1-S2 206 are overly attenuated, while amplitude of the higher frequencies is too great. Embodiments filter the difference signal S1-S2 206 with the inverse of the delay generated by the separation 128 of the two sensor elements 114, 108 to derive an accurate reproduction 204 of the written-in noise 212.

For a signal W(x) written onto the moving tape, the difference D(x) between the sensor signals 214 and 208 is:

$$D = \text{Pos}A - \text{Pos}B,$$

where PosA is the position of sensor element 114 of bump A 112 and PosB is the position of sensor element 108 of bump B 110. Thus, $$D(x) = W(x)(1 - e^{-\omega x G}),$$

where $e^{-\omega x G}$ represents the spatial delay for the W signal between sensor elements 114, 108. The spatial delay G is the gap 128 (e.g., 1.5 mm) between the sensor elements 114, 108, and $$G = K_x X_s,$$

where $X_s$ is the distance between position samples from the tape's servo track 118 (e.g., 50 um burst period).

TapeSpeed relates temporal and spatial frequencies: $\omega = \omega x \times \text{TapeSpeed}$. Thus, where:

$T_s$ is the control sampling period (e.g., 125 us);
$F_s$ is the control sampling frequency (e.g., 8000 samples/s);

$$K = \frac{GF_s}{TapeSpeed}$$

is the number of control samples periods between sensor elements 114 and 108, K need not fall on a control sampling point, and thus K includes a fractional component; and $$T_d = \frac{G}{TapeSpeed}$$
$$= KT_s$$

is the TapeSpeed relative sampling period, for temporal, rather than spatial delay: $e^{-\omega T_d}$.

Comparing a delayed signal 208 with an original signal 214 is a form of correlation analysis, and since the delay between the signals is spatial, the $(1-e^{-wxG})$ response represents a Spatial Correlation Filter ("SCF"). The SCF can be represented using $z=e^{-\omega F_s}$ notation in both the temporal and spatial domains. In the spatial domain:

$$SCF(x) = \frac{D}{W}$$
$$= (1 - z^{-K_x}),$$

where $$K_x = \frac{G}{X_s} = \frac{1500}{50} = 30,$$

is the number of position samples between the sensor elements 114 and 108. Thus, $K_x$ is a constant in the spatial domain.

In the temporal domain:

$$SCF(f) = \frac{D}{W}$$
$$= (1 - z^{-K}),$$

where $$K = \frac{T_d}{T_s} = \frac{1.5 \times 8}{TapeSpeed}$$

is the number of control samples between the sensor elements 114, 108.

In order to reproduce the written-in component 212 (W(x)), embodiments compute the inverse of the SCF ("ISCF"). In the spatial domain:

$$ISCF(x) = \frac{W(x)}{D(x)}$$
$$= \frac{1}{SCF(x)}$$
$$= \frac{1}{(1 - z^{-K_x})}.$$

W=D+W(−30) is a spatial domain burst rate difference equation, where W(−30) is the thirtieth previous filter output value. In the temporal domain:

$$ISCF(f) = \frac{W(f)}{D(f)}$$
$$= \frac{1}{SCF(f)}$$
$$= \frac{1}{(1 - z^{-K})}.$$

$$W = D + W\left(\frac{-12}{TapeSpeed}\right)$$

is a temporal domain control rate difference equation, where the $$\left(\frac{12}{TapeSpeed}\right)$$

delay can be a non-integer multiple of the sampling interval.

Embodiments subtract the ISCF output W signal 204 from the raw position signal (e.g., signal 214) derived from, for example, sensor 114 to produce the desired LTM signal 202: LTM=PosA−W. The LTM signal 202 is provided to a head control loop portion of processing circuitry 130, thereby causing the head 126 position to track the tape 102 position without variations due to the noise 212 written into the servo track 118.

Accordingly, embodiments apply either of the two forms of the W filter discussed supra to implement the ISCF. The spatial approach calculates the filter output at the burst rate, where the bursts written into the servo track measure the distance down the tape, and stores the last 30 bursts of filter output data. The temporal approach calculates the filter output at the control rate (i.e., the rate at which head position updates are performed, e.g., 16 KHz) and applies a sample rate fractional delay to the filter output delay values. The fractional delay is scaled with TapeSpeed.

Embodiments applying the spatial method execute the difference equation at the burst rate, i.e., the rate at which position samples are available from the tape servo track 118. The burst processing rate is different than the fixed frequency control processing rate. Specialized hardware is added to some embodiments to perform the W filter calculations and supply storage for the more than 30 previous filter output values required by the method.

Embodiments applying the temporal method implement a fractional sample delay, i.e., produce samples at a non-integer multiple of the sampling interval. The sample delay changes with tape speed, but allows calculation of the W difference equation at the control rate. Processing at the control rate eliminates the need for the different processing rates and additional storage required by the spatial method.

Figure 3:
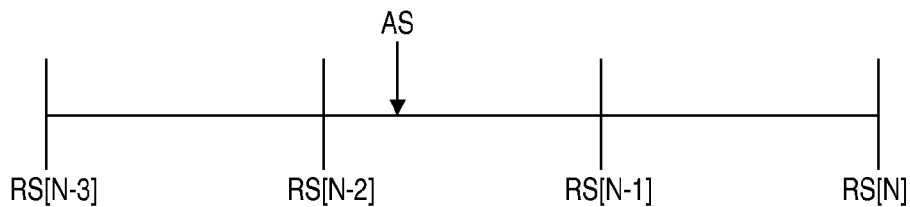
FIG. 3 shows a representation of interpolation applied to adjust the timing of samples used to generate a servo track written-in error signal in accordance with various embodiments.

Embodiments generate fractional sample delays using various interpolation methods. For example, embodiments may implement linear or polynomial interpolation to produce samples between delayed filter output values. FIG. 3 shows a representation of interpolation applied to adjust the timing of samples used to generate a derived servo track written-in error signal 204 in accordance with various embodiments. In FIG. 3, raw samples RS[N] to RS[N−3] are produced at a system sampling rate (e.g., the head control processing rate). However, because the media speed may change continually, samples required to execute the temporal version of the ISCF are unlikely to coincide with the RS samples. In FIG. 3, a time adjusted sample is generated at AS by interpolation using the RS values where the delays are expressed as follows.

$$Tdelay = \left(\frac{GF_s}{TapeSpeed}\right)$$

is the total delay required to produce the requisite sample;
Ndelay=int(Tdelay+0.5) is the number of integer sample periods delayed; and
Fdelay=Tdelay−Ndelay is the fractional portion of a sample period delayed.
To produce the time adjusted sample AS by linear interpolation:
AS=(Fdelay)(RS$_{N-1}$−RS$_{N-2}$)+RS$_{N-2}$, and in z notation
AS=(Fdelay)(RS)(z$^{-1}$)−(Fdelay)(RS)(z$^{-2}$)+(RS)(z$^{-2}$).
To produce the time adjusted sample AS by second order polynomial interpolation:

$$AS = RS_{N-1}\frac{Fdelay(Fdelay-1)}{2} - RS_{N-2}(Fdelay+1)(Fdelay-1) + RS_{N-3}\frac{Fdelay(Fdelay+1)}{2}.$$

W interpolation filter coefficients corresponding to the second order polynomial interpolation comprise:

$$Kw_2 = \frac{Fdelay(Fdelay-1)}{2},$$
$$Kw_1 = -(Fdelay+1)(Fdelay-1), \text{ and}$$
$$Kw_0 = \frac{Fdelay(Fdelay+1)}{2}.$$

Embodiments recalculate the Kw coefficients as the media velocity (e.g., tape velocity) changes. Using the Kw coefficients and storage for a small number (e.g., 4-5) of previous W filter outputs, embodiments compute a fractional sample (Tdelay) delayed W value. First, the fractional delay component of the written-in noise is computed:

$W_{12\text{-}TapeSpeed} = W_{Fdelay} = Kw_2 W_{Ndelay-1} + Kw_1 W_{Ndelay} + Kw_0 W_{Ndelay+1}.$ Next, the written-in noise is computed: $W = D + W_{Fdelay}$.
Finally, lateral tape motion is computed: LTM=PosA−W.

Figure 4:
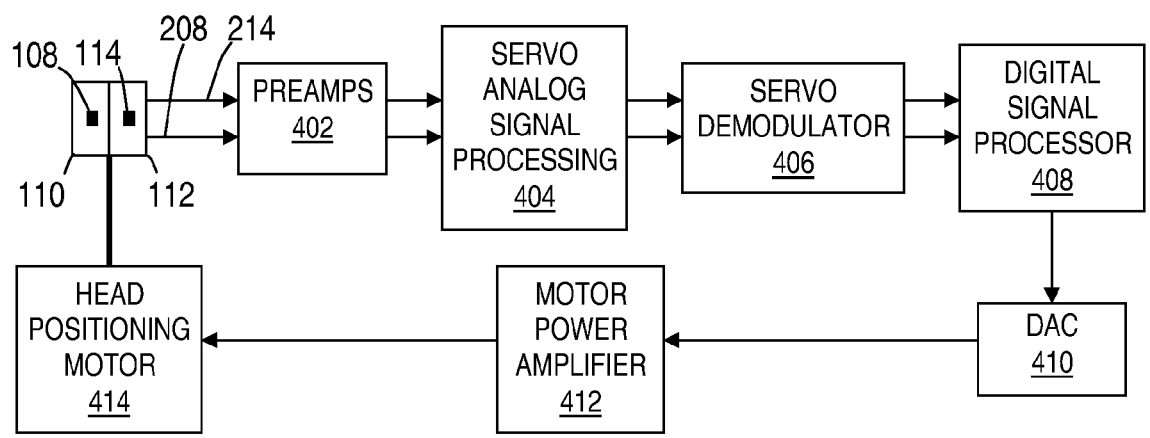
FIG. 4 shows a block diagram of a system that applies fractional sample delays to implement an inverse spatial correlation filter for removing servo track written-in noise from a head position error signal in accordance with various embodiments.

FIG. 4 shows a block diagram of a system that applies fractional sample delays to implement an inverse spatial correlation filter for removing servo track 118 written-in noise 212 from a head position error signal in accordance with various embodiments. Servo track sensor elements 114 and 108, respectively located on bumps 112 and 110 of head 126, detect data written to the servo track 118 of tape 102 during manufacture. The data written to servo track 118 includes written-in noise 212. The servo track sensor elements 114, 108 provide, respectively, signals 214, 208 containing servo track data and written-in noise 212 to preamplifiers 402 ("preamps").

Preamplifiers 402, servo analog signal processing circuit 404, servo demodulator 406, digital signal processor 408, digital-to-analog converter 410, and motor power amplifier 412 are included in processing circuitry 130. The servo analog signal processing circuit 404 applies automatic gain control ("AGC"), filtering, and pulse detection to the amplified servo track signals provided by preamplifiers 402. The servo analog signal processing circuit 404 outputs digital pulses corresponding to the servo track signals 118 to the servo demodulator 406. The servo demodulator 406 performs digital demodulation of the digital pulses received from the servo analog signal processing circuit 404. The digital pulses are created by the servo analog signal processing circuit 404 at points in time when peaks are detected in the waveforms received from the preamplifiers 402. The servo demodulator 406 extracts position information from the timing between the various pulses. Embodiments use various techniques to extract position information. For example, the position information extraction technique used in typical LTO tape drives can be used.

The outputs of the servo demodulator 406 are provided to the DSP 408. The DSP 408 performs mathematical calculations to identify noise 212 written into the servo track 118 and eliminates written-in noise 212 from position error signals that are generated by the DSP 408. The position error signals generated by the DSP 408, which are referred to as real-time position error signals, are used to generate motor drive output signals for controlling adjustments made by a head positioning motor 414. The motor drive output signals are provided to the digital-to-analog converter ("DAC") 410, which provides an analog motor control output to a motor power amplifier 412. The motor power amplifier 412 provides its output to the head positioning motor 414, which is mechanically connected to the head 126, and thus to the sensor elements 114, 108. The head positioning motor 414 adjusts a lateral position of the head 126 with respect to the tape 102.

The DSP 408 performs the computations described above to eliminate written-in noise from head 126 position corrections. Embodiments take the difference of the servo sensor signals 214, 208, and execute an ISCF on the difference to generate the reproduced written-in signal 204. Derived written-in noise signal 204 is subtracted from a servo sensor output, for example signal 214, to produce lateral tape motion signal, LTM 202, which more accurately corresponds to the true position of tape 102.

Some embodiments compute W in the temporal domain by applying an interpolation between previously computed samples of the W 204. Embodiments employ various interpolation methods, for example, linear interpolation or second order polynomial interpolation. The coefficients of the interpolation filter are computed in accordance with media velocity. Embodiments, therefore, re-compute the interpolation filter coefficients whenever a change in media velocity is detected.

The DSP 408 may be implemented as a processor, such as a general/special purpose digital signal processor circuit, a microcontroller, or microprocessor and associated software programming, or other circuitry adapted to perform the computations described above or their equivalents. The term processor as used herein generally refers to a computer central processing unit ("CPU"), embodiments of which comprise a control unit that fetches, decodes, and executes instructions, an arithmetic and logic unit ("ALU") that performs logical and mathematical operations, registers for storage of values used in processor operation, and various other logic. Some embodiments of a processor comprise volatile memory and/or non-volatile memory for storage of data and instructions. Some processor embodiments include circuitry configured to perform only certain specific computations or operations. Thus, one embodiment of a processor includes circuitry specifically designed to perform at least part of ISCF operations described herein.

Figure 5:
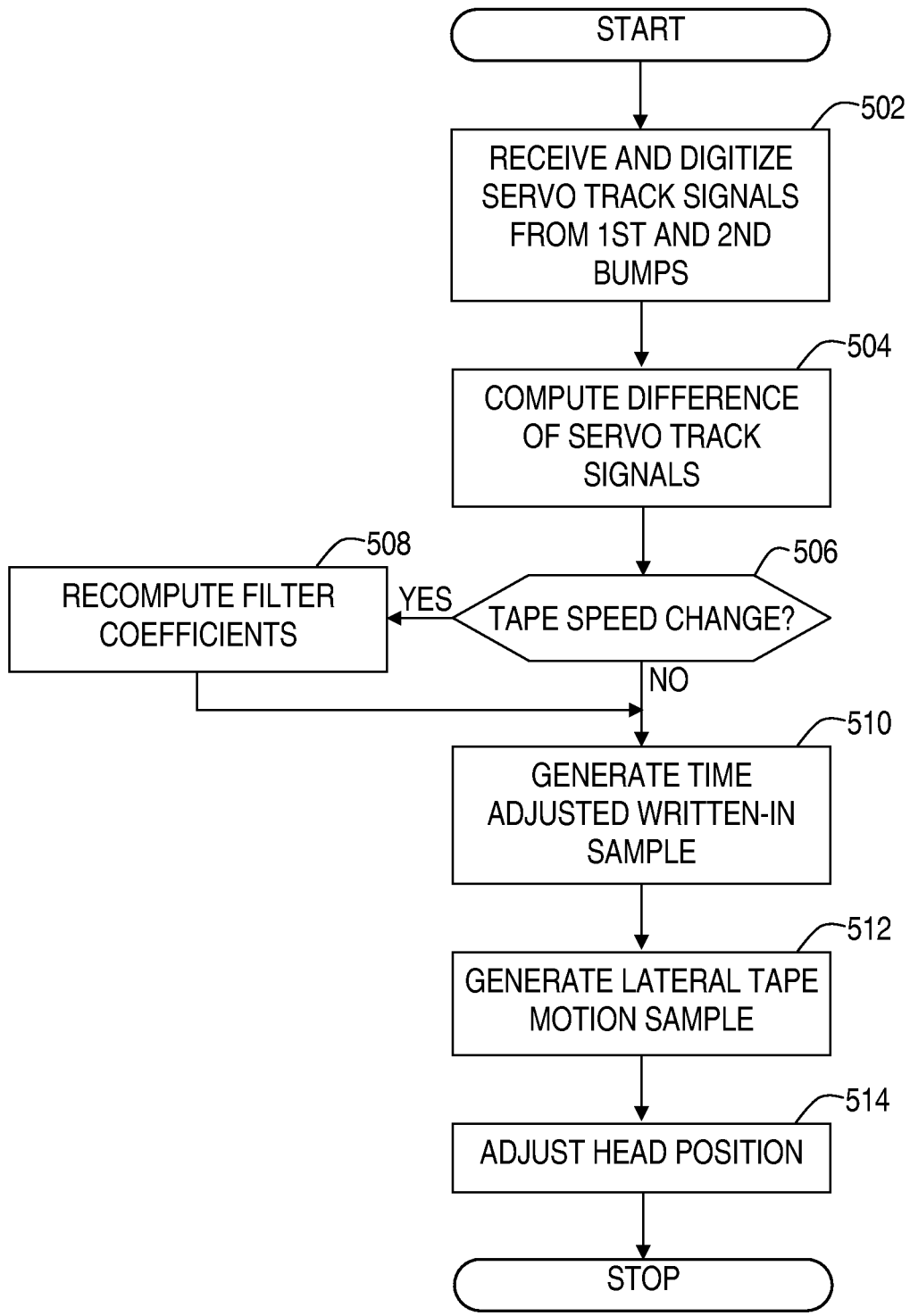
FIG. 5 shows a flow diagram for a method for applying fractional sample delays to implement an inverse spatial correlation filter for removing servo track written-in noise from a head position error signal in accordance with various embodiments.

FIG. 5 shows a flow diagram for a method for applying fractional sample delays to implement an inverse spatial correlation filter for removing servo track written-in noise 212 from a head position error signal in accordance with various embodiments. Though depicted sequentially as a matter of convenience, at least some of the actions shown can be performed in a different order and/or performed in parallel. As a matter of convenience, the following describes various operations in terms of a single servo track. Those skilled in the art will understand that the described operations are applicable to one or more servo tracks.

In block 502, the tape 102 is moving over the head 126, and the servo track sensor elements 114, 108, of Bumps A 112 and B 110 are detecting the servo track signal 118 written onto the tape 102 when the tape 102 was manufactured. Signals 208, 214 produced by the sensor elements 108, 114 are received and digitized by the processing circuitry 130. The signals 208, 214 contain noise component 212 written into the servo track 118 during manufacture. Embodiments execute an inverse spatial correlation filter to enable removal of written-in noise 212 from the servo track signals 208, 214, and, thus, to enable accurate tracking of the tape 102. A temporal domain implementation of the inverse spatial correlation filter can be implemented, as described above, by producing samples of a derived written-in noise signal 204 at non-integral multiples of the control system sampling rate.

In block 504, one of the two servo element signals 208, 214 is subtracted from the other to produce the difference signal S1-S2 206. The difference signal 206 represents the response of a spatial correlation filter. Thus, an inverse spatial correlation filter must be applied to reproduce written-in noise 212 and allow removal of noise 212 from the signal used to reposition head 126. Embodiments applying a temporal method of processing the ISCF, as described above, produce derived written-in noise 204 samples at non-integer multiples of the head control system sampling interval. The timing of these samples 204 is adjusted based on changes in media velocity (e.g., tape speed).

In block 506, changes in tape speed are detected. If the tape speed has changed, then, in block 508, the interpolation filter coefficients are recomputed. The interpolation filter generates samples delayed by a fraction of the control system sample interval (i.e., the interval at which samples of the servo sensors are taken, and at which head 132 position control is performed) where the fractional delay is dependent on tape speed. Embodiments of the interpolation filter apply a variety of interpolation algorithms. For example, linear or polynomial interpolation algorithms may be used.

In block 510, the interpolation coefficients are applied, as described above, to generate a time adjusted (i.e., a fractionally delayed) sample used to compute a derived written-in noise value 204.

Using the derived written-in noise value 204, a lateral tape motion value 202 is generated in block 512. The lateral tape motion value 202 is generated by subtracting the derived written-in noise value 204 from one of the two servo element signals 208, 214. For example, the derived written-in noise value 204 may be subtracted from sensor signal 214 to produce the lateral tape motion signal 202.

In block 514, the lateral tape motion signal sans written-in noise 204 is used to generate a head position error signal that is applied to move the head 126 to the desired position relative to the tape 102.

The above discussion is meant to be illustrative of the principles and various embodiments of the present invention. Numerous variations and modifications will become apparent to those skilled in the art once the above disclosure is fully appreciated. For example, while generation of a time adjusted sample using linear or second order polynomial interpolation have been described herein, one of skill in the art will recognize that other methods of generating samples between known samples may be employed to achieve an equivalent result. Further, embodiments of the present disclosure described with reference to magnetic tape systems are applicable to other systems employing a pre-written guidance signal that contains written-in noise. It is intended that the following claims be interpreted to embrace all such variations and modifications.

What is claimed is:

1. A system, comprising:
   a first sensor and a second sensor disposed so that a point of a storage medium traverses each sensor at a different time; and
   a processor coupled to the sensors;
   wherein the processor varies the timing of a sample representing a noise signal received from the sensors in accordance with medium velocity, and adjusts a position of the sensors based on the sample.

2. The system of claim 1, wherein the processor computes the sample value at a non-integer multiple of a system sampling period using a set of filter coefficients that are computed based on medium velocity, a system sampling rate, and a distance between the first sensor and the second sensor.

3. The system of claim 2, wherein computation of the sample using the filter coefficients comprises one of a linear interpolation and a polynomial interpolation.

4. The system of claim 1, wherein, based at least in part on the sample, the processor reproduces an error signal written into a servo track of the medium and subtracts the error signal from a sensor position signal to create a sensor re-position signal that adjusts the position of the sensors without regard to the error signal.

5. The system of claim 1, wherein the processor adjusts the position of the sensors such that the sensors track lateral motion of the media.

6. The system of claim 1, wherein the processor comprises an inverse spatial correlation filter.

7. A method, comprising:
   receiving a first signal from a first sensor and receiving a second signal from a second sensor;
   computing a difference of the first signal and the second signal;
   adjusting a timing of a noise sample based on medium velocity;
   subtracting a time adjusted noise sample from one of the first signal and the second signal to produce a sensor position error signal;
   positioning the sensors based on the sensor position error signal.

8. The method of claim 7, further comprising computing a set of filter coefficients based on medium velocity, a distance separating the first sensor from the second sensor, and a system sampling rate.

9. The method of claim 8, further comprising computing the filter coefficients based on one of a linear interpolation and a polynomial interpolation.

10. The method of claim 7, further comprising computing the sample value at a non-integer multiple of a system sampling period.

11. The method of claim 7, further comprising generating a lateral tape motion signal based on the time adjusted sample.

12. A tape drive, comprising:
   a first means for detecting a servo track signal written onto a magnetic tape;

a second means for detecting the servo track signal written onto a magnetic tape, the second means disposed from the first means in the direction of longitudinal tape motion;

means for generating a difference signal by differencing a signal produced by the first means for detecting and a signal produced by the second means for detecting;

means for adjusting sample timing of a noise sample derived from the difference signal; and means for positioning the first and second means for detecting to detect the servo track signal based on a signal produced by the means for adjusting sample timing.

13. The tape drive of claim 12, wherein the means for adjusting sample timing adjusts the timing of the sample based on tape speed.

14. The tape drive of claim 12, wherein the means for adjusting sample time computes a sample value at a non-integer multiple of a system sampling period using a set of filter coefficients that are based on tape speed.

15. The tape drive of claim 12, wherein the means for adjusting the sample time computes a sample value based on one of a linear interpolation and a polynomial interpolation.

* * * * *